Patented Jan. 3, 1939

2,142,673

UNITED STATES PATENT OFFICE 2,142,673

BRAZING SOLDER

Franz R. Hensel and Earl I. Larsen, Indianapolis, Ind., assignors to P. R. Mallory & Co., Inc., Indianapolis, Ind., a corporation of Delaware No Drawing. Application September 16, 1937, Serial No. 164,187

1 Claim. (Cl. 219—8)

This invention relates to brazing solders, and has for an object to provide an alloy for use as a welding rod or brazing solder, which has excellent flowing characteristics and, at the same time, produces strong and hard joints.

Other objects of the invention will be apparent from the following description taken in connection with the appended claim.

The present invention comprises the combination of elements, methods of manufacture, and the product thereof brought out and exemplified in the disclosure hereinafter set forth, the scope of the invention being indicated in the appended claim.

While a preferred embodiment of the invention is described herein, it is contemplated that considerable variation may be made in the method of procedure and the combination of elements without departing from the spirit of the invention.

We have discovered that an alloy which contains, besides copper, a certain amount of nickel and/or cobalt silicide, plus cadmium and phosphorus, is ideally suited for making gas or arc welding deposits which have a high hardness and a relatively high heat or electrical conductivity.

Tests have shown that this material, after depositing and peening, will reach a Brinell hardness of over 200. If suitably heat treated this hardness can be increased to as much as 250 Brinell with an electrical conductivity of 30%.

We have found that if the correct proportions of elements are used an easy flowing and self-fluxing gas welding rod can be obtained.

By using a flux consisting of, for instance, borax, boric acid, or similar substances, the flowing characteristics can be still further improved.

The composition which has given the best results, so far, was the following:

|  | Percent |
|---|---|
| Phosphorus | 0.5 |
| Nickel and/or cobalt silicide | 2 to 5 |
| Cadmium | 1 |
| Copper | Balance |

The nickel silicide is of the formula $Ni_2Si$ and the cobalt silicide of the formula $Co_2Si$.

Without heat treating a deposit made with a rod of the above composition will have a Brinell hardness of 120 to 150. If it is desired that the deposit should have a high heat and electrical conductivity, and also a high hardness, a quenching operation from a temperature above 600° C. in connection with a subsequent baking at a temperature below 600° C. is to be applied.

The ranges of alloying elements which we have found to be particularly suitable in connection with our new bronze welding rod are the following:

|  | Percent |
|---|---|
| Nickel and/or cobalt silicide | 2 to 8 |
| Cadmium | 0.05 to 5 |
| Phosphorus | 0.05 to .2 |
| Copper | Balance |

We have found that the combined addition of cadmium and phosphorus is important because it will improve the flowing and fluxing characteristics, and deposit a material which is completely deoxidized, free of gases and blow holes. The bronze welding rods may also contain up to several percent of one or more of the following elements: zinc, tin, aluminum, manganese, iron or silver.

In order to make the above composition suitable for electric arc welding, we propose to use it in conjunction with a coating which can be applied either by a dipping or extrusion process. The coating should contain material which will protect the metal during arc transfer and which will dissolve oxides formed during the welding process.

We have found that this rod is particularly suitable for building up worn surfaces of flash welding dies, or resistance welding dies in general. It can also be used for building up worn steel surfaces. In general, we recommend our new gas or arc welding electrode for any purpose where a copper alloy is joined to another copper or ferrous alloy or a non-ferrous alloy.

As pointed out before, the deposit is free from blow holes, has a high tensile strength, can be treated so that it has a high electrical conductivity and it will also show a definite amount of elongation.

The heat treatment of the deposit may consist of annealing it for three (3) hours at 500° C. It is also possible to first quench the deposit from 850° C. and age it afterwards.

We can vary the composition of our electrodes by changing, for instance, the percentages of nickel and/or cobalt silicide in such a manner that lower strengths and high elongation or higher strengths and lower elongation result. The change in composition will also effect the electrical conductivity, and in general it can be said that with the lower amount of alloying additions, a higher electrical and heat conductivity can be obtained.

It is evident that our new rod is an important improvement, which is of outstanding chemical and commercial value because it deposits directly a hard and heat treated layer, while previously it was necessary to silver braze a piece of hard alloy to a die.

While the present invention, as to its objects and advantages, has been described herein as carried out in specific embodiments thereof, it is not desired to be limited thereby but it is intended to cover the invention broadly within the spirit and scope of the appended claim.

What is claimed is:

Welding rods consisting of copper with cadmium, nickel and/or cobalt silicide, and phosphorus in approximately the following proportions:

| | Percent |
|---|---|
| Cadmium | 0.05 to 5 |
| Nickel and/or cobalt silicide | .1 to 10 |
| Phosphorus | 0.05 to 2 |

FRANZ R. HENSEL.
EARL I. LARSEN.